United States Patent

Amici et al.

[15] 3,658,653

[45] Apr. 25, 1972

[54] PROCESS FOR THE PREPARATION OF ERGOTAMINE AND ERGOCRYPTINE

[72] Inventors: Alba-Maria Amici; Anacleto Minghetti; Tullio Scotti; Celestino Spalla, all of Milan, Italy

[73] Assignee: Societa Farmaceutici Italia, Milan, Italy

[22] Filed: July 17, 1968

[21] Appl. No.: 745,344

[30] Foreign Application Priority Data

July 19, 1967 Italy.....................18542 A/67

[52] U.S. Cl. ..............................................195/81
[51] Int. Cl. .......................................C12d 13/02
[58] Field of Search....................................195/81

[56] References Cited

UNITED STATES PATENTS 3,110,651  11/1963  Kybal et al................................195/81

Primary Examiner—Alvin E. Tanenhultz
Attorney—Curt M. Avery, Arthur E. Wilfond, Herbert L. Lerner and Daniel J. Tick

[57] ABSTRACT

Described is a microbiological process for the preparation of ergotamine and ergocryptine. The process is characterized in that *Claviceps purpurea FI 32/17* is cultivated under aerobic conditions in submerged culture in a liquid nutrient medium containing an assimilable source of carbon, an assimilable source of nitrogen and mineral salts. The cultivation is carried out at from 20° to 35° C. with a pH of from 4.5 to 6.5. *Claviceps purpurea FI 32/17* has been given the index number ATCC 20102 by the American Type Culture Collection, Rockville, Maryland.

1 Claims, No Drawings

PROCESS FOR THE PREPARATION OF ERGOTAMINE AND ERGOCRYPTINE

Our invention relates to a fermentative process for the production of ergotamine and ergocryptine. This process is microbiological and employs a strain of *Claviceps purpurea* F.I. 32/17 (number of the strain collection of Societa Farmaceutici Italia). A mixture of equal parts of the two alkaloids in good yields and a high degree of purity has thus been obtained. Ergotamine and ergocryptine belong to the ergot alkaloids and are well known for their therapeutic properties and their employment in gynecology, internal medicine and neurology.

The new strain of microorganism, which will be further described hereinbelow, is stored in the microbiological laboratories of Societa Farmaceutici Italia where it is called "FI 32/17". It has also been deposited at the Commonwealth Mycological Institute, Ferry Lane, Kent, Surrey (Great Britain) under the index number I.M.I. 131,509, at the American Type Culture Collection, 12301 Parklawn Drive, Rockville, Maryland 20852 (U.S.A.) receiving the index number ATCC 20102 and at the Institute of Plant Pathology of the University of Milan (Italy) receiving the index number IPV F-295. At the last institute, the microorganism is readily available. The strain FI 32/17 is stored by successive passages or by lyophilization of a suspension of conidia. The new strain of *Claviceps purpurea* FI 32/17 has been isolated from a sclerotium of segale cornuta collected on a rye-thorn near Brunico (Bolzano). It shows the following morphological and cultural properties.

Morphological Properties

The mycelium of the young cultures consists of 2.5–4.0 m$\mu$ hyphae in diameter with not very evident septa. The young hyphae are usually without branches, which are just outlined. On growing, the hyphae branch out and the septa become more evident, the hyphae become thicker and show a very irregular diameter owing to the presence of different size cells. This aspect is particularly evident in cultures which do not form conidia. Sometimes the hyphae break at the level of the septa yielding irregular fragments showing characteristics of the artrosphores. According to the composition of the media, the strain FI 32/17 may form conidia or not. Such conidia are oval, regular and about 2.5–3.5 × 5.3–6.5 m$\mu$.

Cultural Characteristics

The cultural characteristics, noticed in cultures incubated at 28° C for 8, 16 and 24 days on slants of the media having the compositions reported in Table I, are as follows:

TS Medium: very good growth at irregular reliefs, of white color often spotted with violet. Backside of the colony from colorless to violet. Soluble pigments absent, conidia present.

C4 Medium: moderate growth in a patina of a more or less powdery aspect, cream or flesh colored. Backside colorless, soluble pigments absent, conidia absent.

Potato glucose Medium: good growth in patina diffuse, little relieved wavy of velvet-like aspect and of whitish color. Backside colorless, soluble pigments absent, conidia present.

Medium 19: moderate growth in a patina of a more or less powdery aspect of whitish color. Backside colorless, soluble pigments absent, conidia absent.

Medium T25D: delayed growth in a mass very relieved, clotted, from white-colorless to pink. Backside flesh colored, soluble pigments absent, conidia absent.

Medium S: good and relieved growth, of white color. Backside colorless, soluble pigments absent, conidia present.

According to the invention, a strain of *Claviceps purpurea* FI 32/17 is cultivated under aerobic conditions in submerged culture in a liquid nutrient medium containing an assimilable source of carbon, an assimilable source of nitrogen and mineral salts. The carbon sources are preferably glucose, saccharose, dextrin, sorbite, mannite, glycerin, citric acid, or succinic acid. The nitrogen source may for example be ammonia, asparagine, peptone, casein hydrolyzates, yeast ex-

TABLE I

| Component | C$_4$ | 19 | T25 D | Potato glucosate | S | TS |
|---|---|---|---|---|---|---|
| Glucose, g | 40 | 7.5 | | | 20 | 40 | |
| Saccharose, g | | | | 150 | | | 100 |
| Citric acid, g | | | | 30 | | | |
| Peptone, g | | 4 | | | | | |
| Meat extract, g | | 4 | | | | 8 | |
| Yeast extract, g | | 1 | 0.1 | | | | 0.1 |
| Asparagine, g | | | | | | | 10 |
| Diammonium phosphate ((NH$_4$)$_2$HPO$_4$), g | 5 | | | | | | |
| Bipotassium phosphate (K$_2$HPO$_4$), g | 1 | | | | | | |
| Monopotassium phosphate (KH$_2$PO$_4$), g | | | | 0.5 | | | 0.5 |
| Magnesium sulphate (MgSO$_4$·7H$_2$O), g | 2.5 | | | 0.5 | | | 0.3 |
| Potassium chloride (KCl), g | 0.5 | | | 0.125 | | | |
| Sodium chloride (NaCl), g | | | 0.5 | | | | |
| Ferrous sulphate (FeSO$_4$·7H$_2$O), mg | 10 | | | 3.5 | | | 7 |
| Zinc sulphate (ZnSO$_4$·7H$_2$O), mg | 10 | | | 3 | | | 6 |
| Ammonia, pH at | | | | 5.2 | | | |
| Agar, g | 18 | 18 | 18 | 18 | 18 | 18 |
| Aqueous potato extract,[1] cc | | 150 | | 500 | | |
| Distilled water, cc., to | 1,000 | | 1,000 | 1,000 | | 1,000 |
| Tap water, cc., to | | 1,000 | | | 1,000 | |
| pH before sterilization | 6.7 | 7.4 | 5.2 | 7.2 | 6.4 | 5.2 |
| Sterilization | 110° C.×20' | 120° C.×20' | 115° C.×20' | 120° C.×20' | 110° C.×20' | 110° C.×20' |

[1] Preparation of the aqueous potato extract: 200 g. of peeled potatoes are cut into pieces and boiled for 45 minutes in 500 cc. of tapwater. The mixture is filtered through gauze and taken up to the initial volume.

tract, meat extract, soya meal, agar, or an ammonium salt such as the nitrate, sulphate or chloride. The mineral salts may for example be chlorides, nitrates, carbonates, sulphates, phosphates of alkali metals, of magnesium, iron, zinc or manganese. The culture can be carried out in flasks or in laboratory or industrial fermenters at a pH of from 4.5 to 6.5 at from 20° to 35° C and generally takes from 4 to 20 days. The alkaloids obtained can be separated and purified by extraction with solvents and chromatography.

The following examples illustrate the invention.

EXAMPLE 1

From a stock of cultures on slants of C$_4$ medium (Table 1) an inoculum is made on a slant of the same medium. The inoculum is incubated at 28° C for 8 days and the culture thus obtained is employed to inoculate two 300 cc flasks, each containing 50 cc of the following SC medium:

| | |
|---|---|
| Glucose | 80 g |
| Peptone | 16 g |
| Tap water to | 1,000 cc |
| pH | 5.9 |
| Sterilization at 110° C for 20 minutes. | |

The flasks are incubated for 4 days at 24° C on a rotary shaker at 220 r.p.m. with a stroke of 3.5 cm. The cultures thus obtained are used, in the amount of 10%, to inoculate 300 cc flasks containing 50 cc of the following 668 medium:

| | |
|---|---|
| Saccharose | 60 g |
| Glycerin | 60 g |
| Glucose | 80 g |
| Yeast extract | 0.1 g |
| Citric acid | 15 g |
| potassium chloride (KCl) | 0.125 g |

| | |
|---|---|
| monopotassium phosphate (KH₂PO₄) | 0.5 g |
| magnesium sulphate (MgSO₄·7H₂O) | 0.5 g |
| ferrous sulphate (FeSO₄·7H₂O) | 7 mg |
| zinc sulphate (ZnSO₄·7H₂O) | 6 mg |
| Distilled water to | 1,000 cc |
| pH 5.2 with ammonia | |

Sterilization at 100° C for 20 minutes.

After 13 days of incubation under the conditions described for the vegetative culture, the cultures contain 2200 γ/cc of a mixture of alkaloids consisting of 48% of ergotamine and 52% of ergocryptine.

EXAMPLE 2

From a stock of cultures on slants of TS medium (Table I) an inoculum is made on a slant of T25D medium (Table I). The inoculum is incubated at 28° C for 10 days and the culture thus obtained is used to inoculate two 300 cc flasks, each containing 50 cc of the following TG medium:

| | |
|---|---|
| Glucose | 100 g |
| Citric acid | 10 g |
| Yeast extract | 0.1 g |
| monopotassium phosphate (KH₂PO₄) | 0.5 g |
| magnesium sulphate (MgSO₄·7H₂O) | 0.3 g |
| ferrous sulphate (FeSO₄·7H₂O) | 7 mg |
| zinc sulphate (ZnSO₄·7H₂O) | 6 mg |
| Distilled water to 1,000 cc | |
| pH 5.2 with ammonia | |

Sterilization at 120° C for 20 minutes.

The flasks are incubated for 6 days at 24° C on a rotary shaker at 220 r.p.m. with a stroke of 3.5 cm. The cultures thus obtained are used, in the amounts of 10%, to inoculate 300 cc flasks containing 40 cc of the following 668B medium:

| | |
|---|---|
| Saccharose | 75 g |
| Glycerin | 75 g |
| Glucose | 100 g |
| Yeast extract | 0.125 g |
| Citric acid | 18.75 g |
| potassium chloride (KCl) | 0.156 g |
| monopotassium phosphate (KH₂PO₄) | 0.625 g |
| magnesium sulphate (MgSO₄·7H₂O) | 0.625 g |
| ferrous sulphate (FeSO₄·7H₂O) | 9 mg |
| zinc sulphate (ZnSO₄·7H₂O) | 7.5 mg |
| Distilled water to 1,000 cc | |
| pH 5.2 with ammonia | |

Sterilization at 120° C for 20 minutes.

After 14 days of incubation under the conditions reported for the vegetative phase, the cultures contain 3800 γ/cc of a mixture of alkaloids consisting of 45% of ergocryptine and 55% of ergotamine.

EXAMPLE 3

An inoculum is made on a slant of C₄ medium (Table I) from a stock of cultures on slants of potato glucosate medium (Table I). The inoculum is incubated at 28° C for 6 days and the culture thus obtained is used to inoculate two 300 cc flasks, each containing 50 cc of SC medium (Example 1). Thereafter, the flasks are incubated for 4 days at 24° C on a rotary shaker at 220 r.p.m. with a stroke of 3.5 cm. The cultures thus obtained are used, in the amount of 10%, to inoculate 300 cc flasks containing 45 cc of the following T25 medium:

| | |
|---|---|
| Saccharose | 300 g |
| Citric acid | 15 g |
| Yeast extract | 0.1 g |
| potassium chloride (KCl) | 0.125 g |
| monopotassium phosphate (KH₂PO₄) | 0.5 g |
| magnesium sulphate (MgSO₄·7H₂O) | 0.5 g |
| ferrous sulphate (FeSO₄·7H₂O) | 7 mg |
| zinc sulphate (ZnSO₄·7H₂O) | 6 mg |
| Distilled water to 1,000 cc | |
| pH 5.2 with ammonia | |

Sterilization at 100° C for 20 minutes.

After 13 days of incubation under the conditions described for the vegetative phase, the cultures contain 1800 γ/cc of a mixture in equal parts of ergocryptine and ergotamine.

EXAMPLE 4, PURIFICATION OF THE PRODUCT

The contents of 120 flasks produced as in Example 1 having a titer between 2000 and 2500 γ/cc are combined. 5 liters of the culture obtained are filtered. The filtrate and the mycelium are separately extracted. The filtrate is adjusted to pH 9 with sodium carbonate and twice extracted with 3 liters of chloroform each time. The chloroform is concentrated in vacuo at 20°–30° C to about one fifth of the starting volume and extracted with a 2% aqueous solution of tartaric acid. The tartaric solution is made alkaline at pH 9 and extracted with chloroform. The mycelium is stirred with 50% of aqueous acetone containing 2% of tartaric acid, filtered and the filtrate is made alkaline to pH 9 and extracted with chloroform. The chloroform extracts of the mycelium and of the filtrate are combined, evaporated to a small volume and precipitated by addition of hexane. A crude product is obtained which, after drying in vacuo, weighs 11.2 g. This material is dissolved in 13 cc of glacial acetic acid. 110 cc of methanol are then added. 15 cc of 5% sulphuric acid in methanol are added and the reaction mixture is allowed to stand overnight at 3° C. Thus 3.9 g of crystalline ergotamine sulphate, melting at 206° C and corresponding to 3.6 g of base, are obtained.

The mother liquors are concentrated under nitrogen atmosphere, reduced pressure to a small volume. The residue is adjusted to 20 cc with water, made alkaline at pH 9.5 with ammonium hydroxide and extracted with chloroform. The chloroform extract concentrated in vacuo at 30° C to small volume is passed through a column of 400 g of silica gel in chloroform. By eluting with chloroform, a fraction is obtained containing ergocryptine which is evaporated to dryness. The residue is dissolved in benzene at the ratio of 1 : 20 and concentrated to a quarter of the starting volume. The reaction mixture is allowed to stand overnight at 5° C, 4.8 g of ergocryptine base are obtained, which after recrystallization from methyl alcohol and drying melts at 212° C; $[\alpha]_D^{20°} = -187°$ (c = 1% in chloroform). By carrying on the elution of the silica column with chloroform and 4% methanol, another fraction is obtained which on evaporation to dryness yields 0.7 g of product. This is dissolved in 7 cc of 80% of aqueous acetone and 0.7 g of ergotamine solvated with 2 molecules of water and 2 molecules of acetone precipitate, melting at 180°C; $[\alpha]_D^{20°} = -124°$ (c = 1% in chloroform).

EXAMPLE 5

From a stock of cultures on slants of T25D medium (Table I) an inoculum on 5 slants of the same medium is carried out which are incubated at 28° C for 10 days. The mycelium of the cultures thus obtained is suspended in 60 cc of water. It is homogenized and then used to inoculate 6 liters of TG medium (Example 2) contained in a 10 liter glass fermenter and sterilized at 120° C for 30 minutes. The inoculum is incubated for 5 days at 24° C with an aeration corresponding to an air flow of 4 liters per minute under shaking at 300 r.p.m. of a rotary shaker provided with 6 paddles. The cultures thus obtained serve to inoculate, in the amount of 10%, 6 liters of T25 medium (Example 3) prepared and sterilized in another 10 liter fermenter. This is incubated at 24° C with an aeration corresponding to an air flow of 6 liters per minute under shaking of 350 r.p.m. of a rotary shaker having 6 paddles. After 10 days of incubation, the culture contains 1200 γ/cc of a mixture in equal parts of ergotamine and ergocryptine.

We claim:
1. A microbiological process for the preparation of ergotamine and ergocryptine, which comprises cultivating *Claviceps purpurea* FI 32/17 under aerobic conditions in submerged culture, in a liquid nutrient medium containing an assimilable source of carbon, an assimilable source of nitrogen and mineral salts, at a temperature from 20° to 35° C and a pH of from 4.5 to 6.5 and separating the ergotamine and ergocryptine produced from the culture.

* * * * *